…

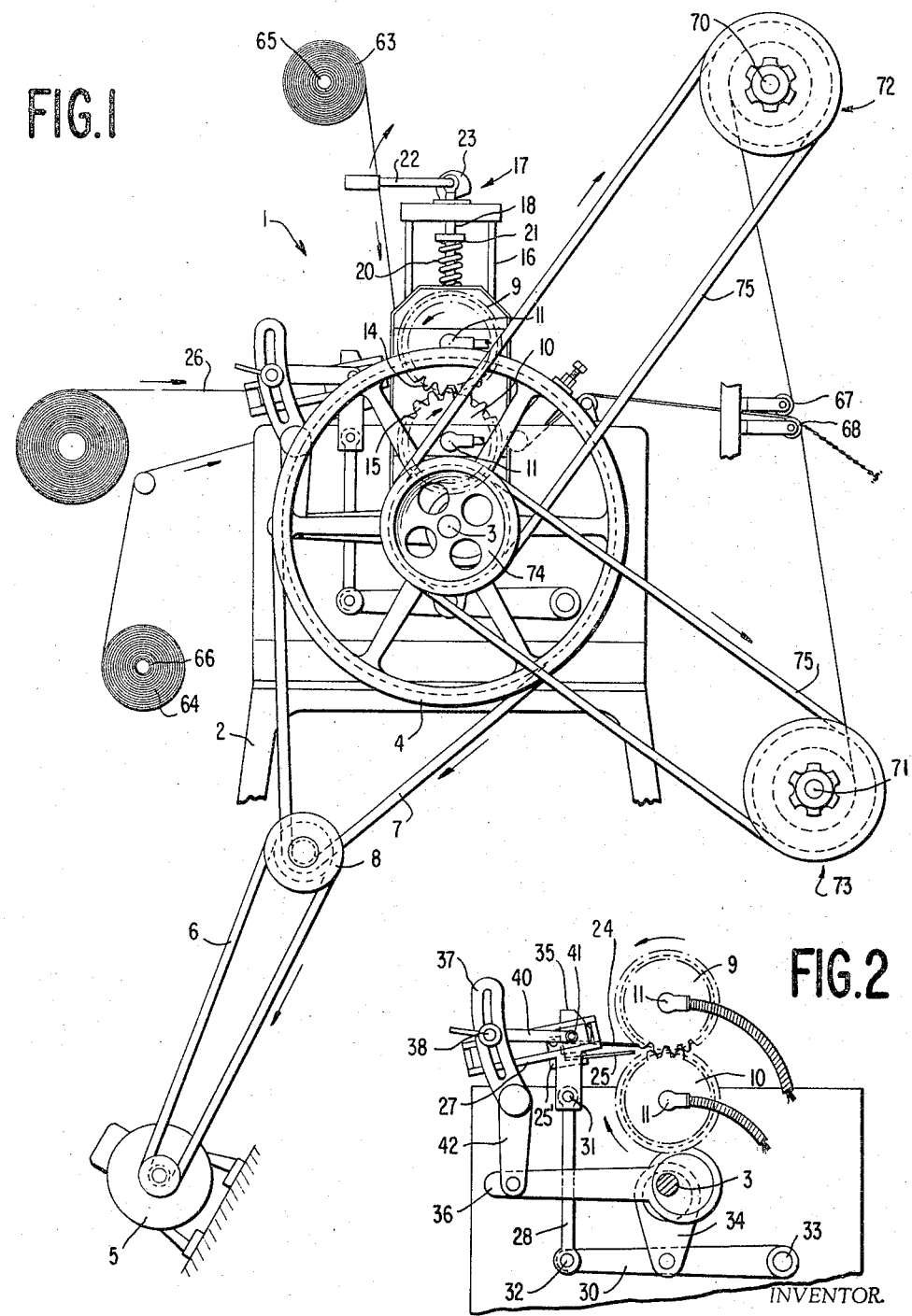

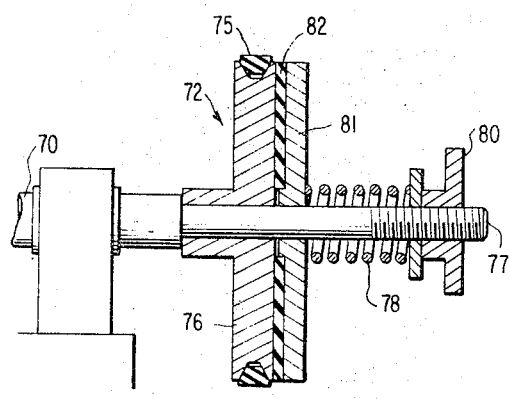
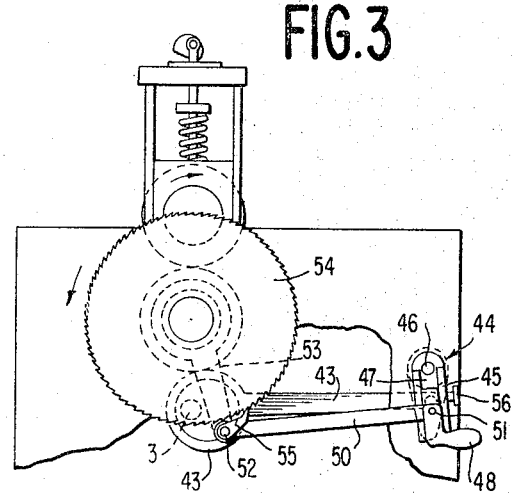
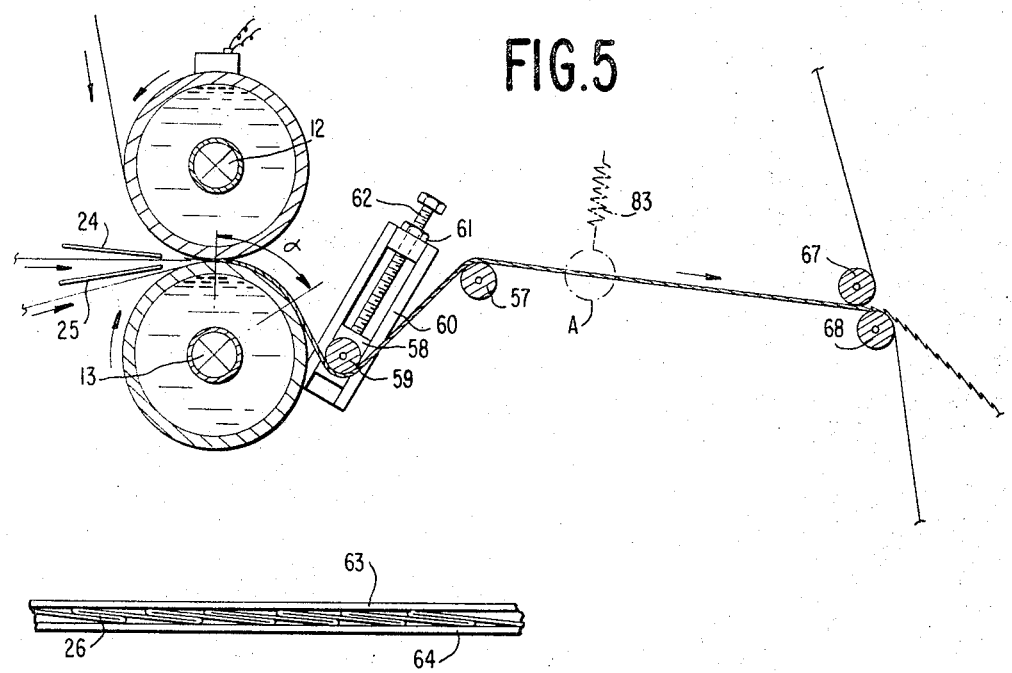

United States Patent Office 3,349,159
Patented Oct. 24, 1967

3,349,159
METHOD AND APPARATUS FOR PLEATING MATERIAL
Sergius N. Ferris Luboshez, 6933 Pinetree Terrace, Falls Church, Va. 22041
Filed Aug. 31, 1964, Ser. No. 393,228
14 Claims. (Cl. 264—282)

This invention relates to a novel method and apparatus for pleating material. More specifically, this invention contemplates a novel method and apparatus for pleating plastic sheet material, such as nylon, cellulose, acetate, polycarbonate and polyester, and the materials described in my copending application Serial No. 200,366, filed June 6, 1962 now Patent 3,257,486. Further, this invention contemplates maintaining the sheet material in its pleated form until a permanent configuration is formed.

In the past, many pleating machines and methods have been envisioned which give improved results in the pleating of woven, natural fabrics, such as wool, silk, cotton, etc. The development of synthetic plastic woven fibers, such as nylon and polyester has, however, presented numerous difficulties and accordingly, has required additional expensive processing and equipment in order for the synthetic woven material to be properly pleated.

In the pleating of these woven fabrics as a step in the process, it has been known to pass the material between rollers under mechanical pressure, after a blade mechanism forms the material into pleats. In a woven fabric, each fiber is free to move, within limits, with respect to its neighboring fibers during the pleating operation. Accordingly, the difficulty of forming flat pleats and maintaining the pleats in this flat condition is not a problem, since the expansion and distortion of the whole fabric is kept to a minimum because they are distributed to the individual fibers.

However, when it is desired to pleat plastic films or sheets, the same apparatus that was successfully used in conjunction with the pleating of woven materials has not proved satisfactory. Such is true because the plastic sheet material does not comprise a plurality of longitudinal and transverse fibers but, on the contrary, is composed of a mixture of synthetic or natural organic substances that are capable of being molded or cast into a unitary body.

It can thus be seen that in plastic sheet material, there is no independent movement within the mixture as there is independent movement of individual fibers in a woven fabric. Accordingly, it can be evident that any local shrinkage or expansion of the plastic sheet material, due to local changes in temperature and humidity, will result in extensive buckling and distortion over a large area of the film or sheet. Even a small amount of applied heat causes excessive nonflatness from uneven shrinkage.

In the pleating of plastic sheets where heat and pressure are employed at intervals, these characteristics are accentuated, and militate against the formation of even and well defined flat pleats.

Polyester terephthalate, for example, has outstandingly valuable properties in use, such as exceptional mechanical strength, physical stiffness, resilience and dimensional stability, in addition to chemical inertness and resistance. Equally, these properties render it outstandingly resistant to fabrication into pleated form. Thus the film retains its resilience up to temperatures sufficiently high to destroy the substance. Moreover, unlike silk, for example, which absorbs 11% of moisture by weight, polyester terephthalate absorbs less than 0.6%, so that treatment with moisture is ineffective for the formation of pleats.

It is an object of the present invention to enable such materials to be pleated.

If plastic sheets were pleated by a conventional cold press machine, a pleat would, in fact, be formed, but when the sheet material would emerge from the machine, the pressed pleat would spring back and assume an open, "saw-toothed" configuration, instead of a "flat-closed" formation, due to the elasticity of the plastic material.

If the rollers of the prior art were heated to moderate temperature a permanent flat pleat would still not be formed, since there would not be sufficient heat transferred to the material to overcome the resilient nature of the plastic material and to maintain the pleat in the pressed condition in order to effectuate the formation of a permanent flat pleat.

The plastic sheet material could, on the other hand, be subjected to a pressing means heated to a high temperature; however, such has not proved satisfactory since the high temperatures have not only been found to melt the plastic sheet material, thereby increasing the possibility of the plastic sheet material being easily distorted, and thus buckle, during the pleating operation, but the plastic sheet material, once pleated, would unform and almost completely return to its original perfectly flat condition. This latter phenomenon is, of course, due to the elastic memory of the material—a characteristic which is always present in plastic material.

The present invention pertains to shaping pleats into plastic materials in such a way that the plastic pleats maintain their form permanently without deforming or distorting the sheet material.

More particularly, this invention contemplates a novel method and apparatus which, after the plastic sheet material is formed into pleats, is maintained in this condition until the material is thoroughly cooled. The invention is constructed to overcome the elastic memory of the plastic sheet material and to provide for stress relaxation therein with the result of producing a plastic sheet material comprising a plurality of well defined and permanently formed pleats.

In general, the preferred form of this novel pleating machine includes a pair of heating and pressing rollers positioned immediately following the pleater, a pair of pressing sheets adapted to be passed between said rollers, a pressure roller acting against said pressing sheets, positioned immediately adjacent the said heating and pressing rollers, and at least one cooling roller for cooling the temperature of the plastic sheet material in order to set said material into permanent pleats, a means for separating the pressing sheets from the plastic sheet material after the material has formed into permanent pleats, and a means for maintaining the pressing sheets under tension.

In accordance with this invention, it is possible to produce a flat pleated plastic sheet in which the pleats remain in a compressed and flat condition after the plastic sheet material has been removed from the pleating apparatus. The pleats thus formed in the plastic material display the characteristic of being permanently formed.

Other advantages of this novel method and apparatus will become apparent by the description in conjunction with the accompanying drawing, in which:

FIG. 1 is a side elevation view of the invention;

FIG. 2 is a fragmentary semischematic right-hand side view of the pleating machine, showing the mechanism for operating the pleating knives;

FIG. 3 is a fragmentary semischematic left-hand side view of the invention, showing the roller-drive mechanism;

FIG. 4 is a sectional view through one of the friction clutches;

FIG. 5 is a schematic fragmentary sectional view of the invention; and

FIG. 6 is an enlarged view of the pleated plastic material sandwiched between two pressing sheets.

The invention is generally indicated by 1 and embodies a frame 2. Rotatably attached within the frame 2 is a horizontal drive shaft 3. An enlarged vertical drive wheel 4 extends outside of the frame 2 but is secured to the drive shaft 3.

The enlarged drive wheel 4 is connected to a motor 5 by a series of belts 6 and 7 which are adapted to rotate around intermediate wheel 8.

Positioned vertically with respect to each other within the frame are a pair of horizontal heating and pressing rollers 9 and 10. Each roller 9 and 10 is hollow and adapted to contain an electrical heating element 11 which extends within and along the entire length of each roller 9 and 10. Each roller 9 and 10 is rotatable about its own shaft 12 and 13, respectively. (See FIG. 5.) In order that each roller 9 and 10 may be rotated in a synchromesh relationship, to each roller shaft 12 and 13 there is attached an intermeshing gear 14 and 15, respectively.

A rack 16 extends upwardly from the frame 2 above the top roller 9. Mounted on the rack 16 is a locking device generally indicated by 17, comprising a vertical shaft 18 extending downwardly within the rack 16 into contact with the top roller shaft 9. A compressible spring 20 encircles the shaft 18 and abuts up against a shaft shoulder 21. Rotatably attached to the vertical shaft 18 is the handle 22 to which is attached a lock nut 23. In such an arrangement, an upward force exerted on the handle 22 will transfer a downward pressure upon the top roller 9 until the top and bottom rollers 9 and 10, respectively, are in pressurized and intimate contact with each other. A downward force upon the handle would, on the contrary, release the tension in the spring 20, and thus release the pressure of the top roller 9 acting upon the bottom roller 10.

Positioned immediately in front of the rollers 9 and 10, and forming an acute angle with respect to each other, are upper and lower pleating knives 24 and 25, respectively. These knives 24 and 25 are adapted to pleat the plastic material 26 which is passed between the knives 24 and 25, as will later be explained. The knives 24 and 25 move generally in a horizontal direction by the action of a series of links motivated by the drive shaft 3.

In particular, the lower knife 25 is secured to an under jaw 25' which, in turn, is attached to the underside of a lift slide rack 27. The underside of this lift slide rack 27 is rotatably attached to a vertically extending arm 28 which is rotatably linked to the horizontal arm 30 by pins 31 and 32, respectively. The horizontal arm 30 is secured to the frame 2 at the pivot point 33 and attached to a first eccentric drive arm 34 which rotates about drive shaft 3.

The upper knife 24 is secured to an upper jaw 35 which is slidable within the lift slide rack 27. The upper jaw 35 slides within the lift slide rack 27 by means of a series of links and is motivated by the second eccentric drive arm 36 which is rotatable about the drive shaft 3.

More specifically, the upper jaw 35 is connected to an adjustable arc slide 37 by means of a screw and bolt assembly 38, arm 40 and upper jaw stud 41. The arc slide 37 is movably linked to the second eccentric drive arm 36 by means of arm 42.

From the above description, it is clear that the acute angle made by the two knives 24 and 25 may be varied by the mere raising and lowering of the arm 40.

FIG. 3 illustrates the drive mechanism which has been constructed to rotate the heating and pressing rollers 9 and 10. This drive mechanism contains a third eccentric shaft 43, designed to rotate about drive shaft 3. The third eccentric shaft 43 is secured to a pawl adjuster, generally indicated by 44. The pawl adjuster comprises a slide rack 45 rotatably attached to a shaft 46. A block 47 to which a handle 48 is attached, slides within the slide rack 45. Attached to the pawl handle 48 by pin 51 is a horizontal arm 50 which is pivotally attached by stud 52 to a collar shaft 53 which is adapted to slide about the shaft 13 of the lower roller 10.

Secured to the lower roller shaft 13 and extending outside the frame 2, opposite to the drive wheel 4, is a ratchet wheel 54. Adapted to fit in each groove of the ratchet wheel 54 is a pawl 55 which is pivotally connected to arm 50 and collar shaft 53 by stud 52.

Ordinarily, the ratchet wheel 54 is designed to move only one increment groove at a time; however, when it is desired to have the pawl 55 skip one or more grooves, the adjustable knob 56 is loosened and the handle 48 and the block 47, attached thereto, are slid downwardly in slide rack 45. This increases the angle between the two arms 50 and the third eccentric shaft 43 and, accordingly, allows the pawl 55 to skip the desired number of grooves.

Positioned on the side of the heating and pressing rollers 9 and 10, opposite to the knives 24 and 25, but attached to the frame 2, are a series of hollow cooling rollers 59 and 57.

It is to be understood that these cooling rollers are adapted to contain a coolant which may be circulated through the rollers.

The cooling roller 59 is secured to a block 58 which is slidable within a slide rack 60. The top of the slide rack 60 carries a bolt 61 into which the screw shaft 62 is threaded for engagement with the slide block 58.

Two elongated rolls of paper 63 and 64 are positioned about their shafts 65 and 66, respectively. Paper from the paper rollers 63 and 64 is threaded between the heating and pressing rollers 9 and 10 and into contact with the cooling rollers 59 and 57. The paper from each roller 63 and 64 is then separated by means of the guide rollers 67 and 68, respectievly, and wound upon the paper spools rotating about the shafts 70 and 71 of the two friction clutches, generally indicated by 72 and 73.

Attached to the drive shaft 3, immediately adjacent to the enlarged drive wheel 4, is a small drive wheel 74. This small drive wheel 74 is connected to the friction clutches 72 and 73 by belts 75.

The friction clutches 72 and 73 are more clearly illustrated in FIG. 4, and comprise a cylindrical casing 76 rotatable about the spool shaft 70. A threaded shaft 77 extends outwardly from the spool shaft 70. Clamped into engagement by the action of compressible spring 78 and lock screw 80, and secured to the threaded shaft 77, is a friction plate 81, to which is attached a frictional material 82 as, for example, felt. The belt 75 from the drive wheel 74 is adapted to ride in the groove of cylindrical casing 76.

In operation, the sheet plastic material 26, to be pleated, is fed between the pleating knives 24 and 25, where the plastic sheet material 26 is first formed into pleats.

The initial forming of the pleats is accomplished as follows. Motor 5, through belts 6 and 7, rotates drive wheel 4 and drive shaft 3. As the drive shaft rotates, the first and second eccentric drive arms 34 and 36 actuate the link assembly attached to the upper and lower knives 24 and 25, and thereby impart to the knives a substantial horizontal reciprocating motion.

Through the reciprocating action of the pleating knives 24 and 25, the plastic material is fed, incrementally, as opposed to a smooth and continuous manner, to the pressing and heating rollers 9 and 10.

Because the pleated material is moved in a step-by-step fashion, the heating and pressing rollers are synchronized to this same motion. This is accomplished by the action of the third eccentric shaft 43, attached to the drive shaft 3. The rotation of the third eccentric shaft 43 actuates the pawls 55 which move the ratchet wheel 54. In turn, the rotation of the ratchet wheel 54 moves, incrementally, the upper and also the corresponding lower heating and pressing rollers 9 and 10.

Immediately upon being pleated, the plastic material is sandwiched between pressing sheets 63 and 64 and passed between the heating and pressing rollers 9 and 10.

The pleated material 26 and paper sheets 63 and 64 are caused to remain in contact with the lower heating and pressing roller 10 for a variable angular distance (α, see FIG. 5) by the action of adjustable cooling roller 59.

The pleated material, sandwiched between the pressing sheets 63 and 64 then is passed over and in contact with cooling rollers 59 and 57.

Upon allowing the pleated material to cool for a sufficient amount of time, it is conveyed between two guide rollers 67 and 68, where it is separated from the paper sheets 63 and 64 which, in turn, are wound upon spool shafts 70.

It is to be understood that the plastic pleated material, emerging from the heating and pressing rollers 9 and 10, is immediately maintained in a pressed and flat condition by being positioned between the pressing sheets 63 and 64, which are maintained under tension by the action of the friction clutches 72 and 73. Accordingly, during the entire pleating operation, since tension is always maintained on the pressing sheets, no slack occurs in the sandwich layer. This latter feature is most essential, since otherwise the pleats would, either due to plastic memory of the plastic sheet material, unfold and return to their perfectly flat condition, or would, due to their resilient nature, spring open, and result in an open sawtoothed configuration.

The tension exerted upon the pressing sheets maintains them in contact with the pleated material on each side. Thus, any tendency of the pleats to spring open, due to elasticity of the plastic material, is opposed and counteracted by the tensioned pressing sheets. Under these conditions, the plastic material is cooled and permanently set with the pleats firmly pressed in a plane substantially parallel to the plane of the pressing sheets.

This tension upon the pressing sheets 63 and 64 is accomplished by the combined utilization of friction clutches 72 and 73, and the adjustable cooling roller 59.

As mentioned previously, the motor 5, by the action of a series of belts 6 and 7, drives the drive shaft 3. The rotation of the drive shaft rotates the small drive wheel 74 and continuously rotates the cylindrical casing 76 of the frictional clutch 72 about the threaded shaft 77 by means of belt 75.

When it is desired to rotate the spool shafts 70, lock screw 80 is threaded about shaft 77, thereby compressing spring 78 and, accordingly, forcing the friction plate 81 and frictional material 82 up against the cylindrical casing 76.

In order to provide still another technique for maintaining tension upon the pressing sheets 63 and 64, provision may be made for an additional cooling roller A mounted on a spring 83 adapted to exert a pressure against the sandwiched layer during the cooling step.

As above mentioned, this application is concerned particularly with pleating plastic material. However, experience has indicated that plastic materials of the type previously mentioned have been extremely difficult to pleat. It has been found that using this novel method and apparatus, polyester plastic sheet material about 2 mils in thickness, could be satisfactorily pleated when the rollers 9 and 10 were maintained at 250° F. Shrinkage does not exceed about ½%.

I have found that under the said conditions, and with the film fed into the machine at the rate of about 40 inches per minute for pleats having 3/16 inch "show" and 3/16 inch "underlay," closed, even, flat pleats are produced. The elastic memory of the material is overcome, stress relaxation is provided for, and no buckling and distortion of the material arises due to uneven shrinkage. Local relaxation occurs at the point of crease to afford the spring-back required when the structure is elongated.

The folds of the pleats are heat-set and permanent pleats are formed under the method of treatment provided for.

Of course, it is to be understood that the exact heating and pressing roller temperature and the precise angular distance (α, FIG. 5) about the periphery of the heating and pressing rollers to which the plastic material must be exposed depends upon the thickness of the plastic sheet material to be pleated, the thickness of the pressing sheets, the thickness of the rollers and the type of heating medium utilized in the rollers, as well as the velocity of the material through the machine.

One plastic sheet material which, in the past, has exhibited pleating problems, but can be easily pleated according to this invention, is a polyester film made from polyethylene terephthalate, known as Mylar. The use of this material is highly desirable since its tensile strength and stiffness are several times greater than that found in most plastic films. In addition, this material has an excellent resistance to failure by repeated flexing and exceptional resistance to initial tear. These properties are combined into a film which evidences high impact and superior burst strength.

Any pressing sheets of suitable composition, for example, paper, or the like, may be utilized in this invention; however, they must be of suitable tensile strength so as to exert a sufficient pressure upon the pleated material to maintain it in a flat-pressed condition.

If it is desired to utilize paper, and it is desired to conserve the heat in the paper and plastic material, the outer surface of the paper may contain a metallic coating to prevent the rapid emission of radiant heat energy.

By use of decalcomania paper, ink may be transferred from the paper to the pleated material on one or both sides of the plastic material during the pleating operation and thus produce the article forming the subject matter of my copending application Serial No. 200,366, filed June 6, 1962.

This invention has been described with reference to the forming of plastic sheet materials, such as polyester film, which is particularly resistant and difficult to pleat. However, it is to be understood that natural and synthetic fabrics, as well as, any impregnated wrinkle proof fabrics also may be pleated by the method and apparatus of this invention to give an improved and superior product. It is understood, that many different types of pleats may be produced by this invention, e.g., side pleats, box pleats, and mixtures of each of these, without departing from the spirit of the invention. Such pleats are described in my aforementioned copending application.

It is further understood, that this invention is constructed to cool the pleated material rapidly or slowly, suddenly or gradually, as desired.

Various changes may be made in the details of the invention as described herein without sacrificing any of the advantages thereof or departing from the scope of the appended claims.

I claim:

1. An apparatus for pleating sheet material, comprising:
    (a) means for continuously introducing a sheet material into and through said apparatus;
    (b) means positioned within said apparatus adapted to produce a plurality of transverse pleats in said material;
    (c) means positioned immediately after said pleating means for simultaneously pressing-flat and heating said pleated material as the material continuously moves through the apparatus;
    (d) means for maintaining said pleated material in a pressed-flat condition during its continual movement within the apparatus;
    (e) tensioning means for exerting a continuous pressure upon the means for maintaining the pleated material in a pressed-flat condition;
    (f) means for cooling said pressed-flat pleated material prior to its exit from said apparatus; and
    (g) means for removing said pressed-flat pleated material from said apparatus.

2. The apparatus of claim 1, wherein said cooling means comprises a plurality of hollow rollers adapted to contain a cooling medium.

3. The apparatus of claim 2, wherein said cooling rollers are adjustable and adapted to maintain said pressing sheets in tension.

4. The apparatus of claim 1, wherein said sheet material is plastic.

5. The apparatus of claim 4 wherein said plastic sheet material is selected from the group consisting of nylon, cellulose, acetate, polycarbonate and polyester.

6. An apparatus for pleating sheet material, comprising:
   (a) means for continuously introducing a sheet material into and through said apparatus;
   (b) means positioned within said apparatus adapted to produce a plurality of transverse pleats in said material;
   (c) means positioned immediately after said pleating means for simultaneously pressing-flat and heating said pleated material as the material continuously moves through the apparatus;
   (d) a pair of elongated tensioned pressing sheets acting against each side of said sheet material for maintaining the pleated material in a pressed-flat condition during its continual movement within the apparatus;
   (e) means for cooling said pressed-flat pleated material prior to its exit from said apparatus; and
   (f) means for removing said pressed-flat pleated material from said apparatus.

7. The apparatus of claim 6, wherein said pressing sheets are paper.

8. The apparatus of claim 7, including a means for maintaining said pressing sheets in tension.

9. The apparatus of claim 8, wherein said pressing sheet material is held in constant tension by a friction clutch associated with each of said pressing sheets.

10. In the method of pleating sheet material in an apparatus, including the steps of:
   (a) introducing the sheet material into and through said apparatus;
   (b) pleating said material into a plurality of transverse pleats;
   (c) simultaneously pressing-flat and heating said pleated material immediately after said material has been pleated;
   (d) thereafter continuously maintaining said pleated material in a pressed-flat condition by applying pressure substantially across each side of said sheet material during its continual movement through said apparatus;
   (e) cooling said material until the pleats are set in a permanent, pressed-flat condition; and
   (f) removing said material in its pressed-flat condition from said pleating apparatus.

11. The method of claim 10, wherein said pleated sheet material is maintained in a continously pressed condition until said material is cooled.

12. The method of claim 10, wherein said sheet material is plastic.

13. The method of claim 11, wherein said material is pressed immediately after it is pleated.

14. The method of claim 13, wherein said sheet material is selected from the group consisting of nylon, cellulose, acetate, polycarbonate and polyester.

References Cited

UNITED STATES PATENTS

| | | | |
|---|---|---|---|
| 1,789,421 | 1/1931 | Angelus | 223—30 |
| 2,097,601 | 11/1937 | Potdevin | 223—30 X |
| 2,318,497 | 5/1943 | Kassel | 233—30 X |
| 2,758,760 | 8/1956 | Bock et al. | 223—30 |
| 2,840,283 | 6/1958 | Roussos | 223—30 |

ROBERT F. WHITE, *Primary Examiner.*

JORDAN FRANKLIN, *Examiner.*

G. V. LARKIN, R. R. KUCIA, *Assistant Examiners.*